United States Patent Office

3,498,940
Patented Mar. 3, 1970

3,498,940
DIMER FATTY ACID MODIFIED POLYESTER-URETHANE COMPOSITIONS
Deno Laganis, Schenectady, N.Y., assignor to Schenectady Chemical, Inc., Schenectady, N.Y., a corporation of New York
No Drawing. Filed Feb. 13, 1968, Ser. No. 704,993
Int. Cl. C08g 22/10; C09d 3/72
U.S. Cl. 260—20                                                         11 Claims

ABSTRACT OF THE DISCLOSURE

Polyester-urethanes are prepared by reacting an aromatic diisocyanate with a polyester made from (1) a mixture of a dimerized long chain fatty acid and isophthalic acid, terephthalic acid and benzophenone dicarboxylic acid with optionally a saturated alkanedioic acid having 5 to 10 carbon atoms and (2) a mixture of a diol and a polyhydric alcohol having at least 3 hydroxyl groups. The polyester has an acid number not over 2.

---

The present invention relates to novel organic solvent soluble polyester-urethane resins.

At the present time there are available magnet wires coated with a Class H or higher wire enamel such as Isonel 200, a polyester of tris(2-hydroxyethyl isocyanurate) and terephthalic acid, see Meyer Patent 3,342,024 and Isomid, a polyester-imide of tris(2-hydroxyethyl isocyanurate), terephthalic acid and oxydianiline, see British Patent 1,082,181 and French Patent 1,478,938.

The development of such magnet wire coatings has required the development of insulating varnishes also having thermal aging properties of a very high order, in the Class H or higher category (180° C. or higher) which can be applied over a magnet wire coated with a Class H wire enamel.

Accordingly it is an object of the present invention to prepare novel resins having a Class H or higher rating suitable for use in insulating varnishes which can be applied to wire coated with such Class H wire enamel.

Another object is to prepare insulating varnishes suitable for such high temperature applications.

An additional object is to prepare novel high temperature resistant organic solvent soluble polyesterurethane resins compatible with oil soluble phenol-aldehyde resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a specific type of polyesterurethane as hereinafter described. The resin is soluble in conventional insulating varnish solvents such as aliphatic and aromatic hydrocarbons, ketones, etc., and does not require the inclusion of phenolic solvents, e.g., cresylic acid. As is well known in the art, the use of phenolic solvents is precluded from insulating varnishes.

As the polyester, there is employed a reaction product of:

(a) 35–90%, preferably 45–70%, based on the total moles of acid of an aromatic dibasic acid which is isophthalic acid, terephthalic acid or 4,4′-benzophenone dicarboxylic acid or a mixture of two or more of these aromatic acids, (b) 10–65%, preferably 30–55%, based on the total moles of acid of an aliphatic dibasic acid which is a dimerized long chain fatty acid alone or a mixture of such dimerized fatty acid with up to 75 mole percent of an alkanedioic acid having five to ten carbon atoms, e.g., glutaric acid, adipic acid, azelaic acid and sebacic acid. The preferred modifying acid is adipic acid. Preferably the dimerized acid is present in an amount of at least 50 mol percent of the total aliphatic dibasic acid. The dimerized acid is essential to obtain the requisite flexibility in the product. The dimerized acid is the dimer of unsaturated fatty acids containing 18 to 24 carbon atoms. Hence the dimerized acid contains at least 36 carbon atoms. Examples of dimerized acids are dimerized linoleic acid, dimerized linolenic acid, dimerized menhaden oil acids, dimerized tall oil acids, dimerized soybean oil acids, dimerized tung oil acids, dimerized oiticica oil acids, dimerized eleaostearic acid, dimerized isomerized soybean oil acids, dimerized cottonseed oil acids, dimerized safflower oil acids, dimerized licanic acid, dimerized isomerized linolenic acid, etc.

(c) A diol such as neopentyl glycol, ethylene glycol, propylene glycol, butane diol-1,3, butanediol-1,4, hexane diol-1,6, 1,4-cyclohexanedimethanol, 2,2,4,4-tetramethyl-1,3-cyclobutanediol, pentanediol-1,5, butene-2-diol-1,4. The preferred diol is neopentyl glycol because of its greater thermal stability. The diol component supplies 40–80%, preferably 55–80% of the total OH groups on an equivalent basis.

(d) A polyhydric alcohol containing at least three hydroxyl groups such as trimethylol ethane, trimethylol propane, glycerine, pentaerythritol, sorbitol, 1,2,6-hexanetriol, dipentaerythritol, tris (2-hydroxyethyl) isocyanurate. The polyhydric alcohol having at least three hydroxyl groups supplies 20–60%, preferably 20–45%, of the total OH groups on an equivalent basis.

The ratio acid groups to alcohol groups can range from 1:1 to 1:1.6. The esterification desirably should be carried to an acid number of two or below to avoid undesired reaction of free carboxyl groups with the isocyanate which can, for example, form gases such as carbon dioxide. Then an aromatic diisocyanate is added, preferably toluene diisocyanate, in an amount of 10–40%, preferably 15–25%, based on the weight of the polyester to form a polyesterurethane resin.

Examples of suitable diisocyanates include 2,4-tolylene diisocyanate, 2,6-tolylene diisocyanate, m-phenylene diisocyanate, p-phenylene diisocyanate, 1,5-naphthalene diisocyanate, 4,4′-diphenyl ether diisocyanate, dianisidine diisocyanate.

The diisocyanate is used in a molar amount of 10–40%, preferably 15–25%, based on the total moles of acid and alcohol in the polyester, or is used in an amount of 5 to 35%, preferably 10 to 25%, of the weight of the polyester.

It is important that the diisocyanate be reacted with the polyester prior to addition of the phenolic resin in order to make a satisfactory varnish. This differs from Meyer Patent 3,249,578 which discloses reaction of a polyisocyanate with a polyester and a phenolic resin (or melamine resin) in Examples 9–11 after application to the wire.

Isocyanates containing more than two isocyanate groups are undesired except in very small amounts since they cause undue cross linking and reduce the flexibility of the product.

The polyester-urethanes thus prepared are compatible with oil soluble phenol-formaldehyde and triazine-formaldehyde resins and reactive therewith under heat-curing conditions to yield coatings, such as insulating varnishes, with high thermal stability.

There can be employed straight or mixed alkyl-substituted phenols reacted with formaldehyde to form resins. Among the phenols favored are p-t-butyl phenol, p-t- amyl phenol, p-phenyl phenol, o-cresol, p-cresol, cresylic acid, 2,2-bis (p-hydroxyphenyl) propane, p-t-octyl phenol, o-t-butyl phenol. There can be used any of the phenol-formaldehyde resins shown in Honel Patent 1,800,296.

As indicated, mixed phenolic resins can be used. The p-t-amyl phenol-formaldehyde resin employed in the examples was prepared by the alkaline (NaOH) catalyzed reaction of 1 mole of the p-t-amyl phenol with 1.5 moles of formaldehyde. A typical example of a mixed phenolic resin which can be used is the alkaline (NaOH) catalyzed reaction product of 0.75 mole of p-t-butyl phenol and 0.25 mole of 2,2-bis (p-hydroxy-phenyl) propane with 1.5 moles of formaldehyde, or the reaction product of 0.5 mole of p-t-amyl phenol, 0.5 mole of p-t-octylphenol and 1.5 moles of formaldehyde. The oil-soluble phenol-formaldehyde resins are of the heat reactive type.

The triazine resins employed are alkylated triazine-formaldehyde resins such as butylated melamine-formaldehyde, butylated benzoguanamine-formaldehyde, amylated acetoguanamine-formaldehyde, methylated melamine-formaldehyde, as well as other alkylated triazine-formaldehyde resins as shown in Widmer Patent 2,197,357 and in Schenectady British Patent 1,046,910.

The phenolic resin (or amino triazine resin) is used in an amount of 20 to 60%, preferably 30 to 50% of the total weight of the polyester-urethane and the phenolic resin.

In preparing the varnish, there are employed one or more conventional varnish solvents, e.g., aromatic and aliphatic hydrocarbons such as xylene, mineral spirits, petroleum, naphtha, heavy coat tar naphtha, benzene, toluene, decane, hexane, cyclohexane, petroleumether, octane.

Frequently the solvent includes an oxygenated solvent such as butyl alcohol, amyl alcohol, ethylene glycol monoethyl ether, ethylene glycol monomethyl ether acetate, dioxane, diethylene glycol monoacetate, ethylene glycol, capryl alcohol, ethyl alcohol, isophorone, acetone, methyl ethyl ketone, methyl isobutyl ketone methyl butyl ketone, mono butyl ether of ethylene glycol, diisobutyl ketone and butyl acetate, also there can be used N-methyl pyrrolidone, tetrachloroethylene or dimethyl formamide as a solvent.

Unless otherwise indicated, all parts and percentages are by weight.

EXAMPLE 1

|  | Mols | Parts |
| --- | --- | --- |
| (A) Neopentyl glycol | 4.6 | 478.5 |
| (B) Trimethylolpropane | 1 | 134 |
| (C) Isophthalic acid | 1.125 | 187 |
| (D) Adipic acid | 0.75 | 109 |
| (E) Isophthalic acid | 1.125 | 187 |
| (F) Dimerized fatty acids (dimerized tall oil acids, Empol 1018) | 1 | 590 |
| (G) Xylol | | 628 |
| (H) Tolylene diisocyanate (mixed 2,4 and 2,6-isomers) | 1 | 174 |

Materials A, B, C and D were charged into a 3 liter, three-neck flask equipped with agitator, gas inlet tube, thermometers for flask and distilling head, 3-bubble cap Snyder fractionating column and water-cooled condenser. The temperature was raised to 400–450° F. in three to four hours and maintained there until the melt was clear in the hot condition as well as when a cold pill sample was clear. Then E and F were added and reduction continued at 400–450° F. with periodic sampling until an acid number of not over 2 was reached at 60% solids in xylol.

The mixture was then cooled to below 150° F. and ingredients G and H added. The temperature was raised to 150° F. and 1 part of dibutyltin dilaurate added as a catalyst to hasten the urethane formation.

The batch was checked at periodic intervals for viscosity and controlled to a final viscosity of T½ (Gardner-Holdt) measured at 50% solids in xylol.

The physical properties of the actual final resin were viscosity Z 1½, acid No. 0.5, specific gravity 0.996, solids 65%, solvent xylol.

EXAMPLE 2

| | Parts |
| --- | --- |
| Resin solution prepared in Example 1 | 600 |
| p-t-Amylphenol-formaldehyde resin, 48% solids in xylol | 345 |
| Xylol | 147 |

The above ingredients were mixed at room temperature to given an insulating varnish having a viscosity on the Gardner-Holdt scale of R½, solids 51%, specific gravity at 77° F. of 0.966.

The varnish was suitable for directly coating electrical conductors such as copper wires, motor rotors, motor stators, armature and field coils of motors and the like but was especially useful when applied over magnet wires (or other wires) coated with a Class H wire enamel such as Isonel 200.

EXAMPLE 3

| | Parts |
| --- | --- |
| Resin solution prepared in Example 1 | 540 |
| p-t-Amylphenol-formaldehyde resin, 48% solids in xylol | 484 |
| Xylol | 122 |

The above materials were mixed at room temperature to give an insulating varnish having a Gardner-Holdt viscosity of S¾, a specific gravity at 77° F. of 0.968 and solids 51%.

The insulating varnish was useful in the same manner as the varnish of Example 2.

EXAMPLE 4

|  | Mols | Parts |
| --- | --- | --- |
| (A) Neopentyl glycol | 4.05 | 422 |
| (B) Trimethylol propane | 1.15 | 154 |
| (C) Isophthalic acid | 1 | 166 |
| (D) Adipic acid | 0.5 | 73 |
| (E) Isophthalic acid | 1 | 166 |
| (F) Dimerized tall oil acids | 1 | 590 |
| (G) Xylol | | 1100 |
| (H) Tolylene diisocyanate (mixed 2,4 and 2,6 isomers) | 1.5 | 261 |

Materials A, B, C and D were raised to 400–450° F. in 3.5 hours and maintained there until the melt was clear in the hot condition as well as when a cold pill sample was clear. Then E and F were added and reaction continued at 400–450° F. with periodic sampling until an acid number of not over 2 was reached at 60% solids in xylol.

The mixture was then cooled to below 150° F. and material G and H were added. The temperature was raised to 150° F. and 1 part of dibutyltin dilaurate added as a catalyst to hasten the urethane formation.

The batch was checked at periodic intervals for viscosity and controlled to a final Gardner-Holdt viscosity of Y¾ at 50% solids in xylol. The resin solution was diluted to 55% solids in xylol.

The resulting resin solution was mixed with p-t-amylphenol-formaldehyde resin and xylol as in Example 2 to produce an insulating varnish.

EXAMPLE 5

The procedure of Example 1 was repeated except that the adipic acid was replaced by 0.75 mole of dimerized tall oil acids to produce a polyester-urethane resin solution.

The resin solution was mixed with p-t-amylphenol-formaldehyde resin and xylol as in Example 2 to produce an insulating varnish.

The insulating varnishes of the present invention exhibited thermal properties in the Class H range and higher when applied as an overcoat to copper wire undercoated with Isonel 200.

What is claimed is:

1. A polyester-urethane consisting of the reaction product of (1) a polyester having an acid number of not over about 2 and (2) 5 to 35% of an aromatic diisocyanate based on the weight of the polyester, said polyester being the reaction product of (a) a plurality of dibasic acids with (b) a plurality of polyhydric alcohols, at least one of the acids being an aromatic acid selected from the group consisting of isophthalic acid, terephthalic acid and benzophenone dicarboxylic acid in an amount of 35–90% of the total moles of dibasic acid and 65–10% of at least one aliphatic acid from the group consisting of dimerized long chain fatty acids and mixtures of such dimerized fatty acids with up to 75 mole percent based on the total aliphatic acid of a saturated alkanedioic acid having 5 to 10 carbon atoms, said polyhydric alcohol comprising 40 to 80% on an equivalent basis of a diol based on the total polyhydric alcohol and 60 to 20% of a polyhydric alcohol containing at least 3 hydroxyl groups, the total number of hydroxyl groups in the polyhydric alcohol reactant being from 1 to 1.6 per total carboxyl groups on the acid reactant.

2. A polyester-urethane according to claim 1 wherein the dimerized fatty acid contains at least 36 carbon atoms.

3. A polyester-urethane according to claim 2 wherein the aromatic acid comprises 45 to 70% of the total moles of acid, the dimerized fatty acid comprises at least 50% of the total moles of aliphatic acid, the diol comprises 55 to 80% of the total equivalents of hydroxyl available and the aromatic diisocyanate comprises 10 to 25% of the weight of the polyester.

4. A polyester-urethane according to claim 3 wherein the diol is neopentyl glycol.

5. A polyester-urethane according to claim 4 wherein the polyhydric alcohol containing at least 3 hydroxyl groups contains only 3 hydroxyl groups and the aromatic diisocyanate is a tolyene diisocyanate.

6. An insulating varnish comprising the polyesterurethane of claim 1, an inert organic solvent and an oil soluble member of the group consisting of oil soluble phenol formaldehyde resins and oil soluble aminotriazine-formaldehyde resins reactive with said polyester-urethane.

7. An insulating varnish according to claim 6 wherein the oil soluble resin is a phenol-formaldehyde resin.

8. An insulating varnish according to claim 7 wherein the solvent consists of hydrocarbon.

9. An insulating varnish according to claim 7 wherein the dimerized fatty acid contains at least 36 carbon atoms and comprises at least 50% of the total moles of aliphatic acid, and the diol is neopentyl glycol.

10. An insulating varnish according to claim 9 wherein the polyhydric alcohol containing at least 3 hydroxyl groups contains only 3 hydroxyl groups and the aromatic diisocyanate is tolylene diisocyanate.

11. A polyester-urethane according to claim 1 wherein the diisocyanate is used in a molar amount of 10–40% based on the total moles of acid and alcohol in the polyester.

References Cited

UNITED STATES PATENTS

| 3,406,134 | 10/1968 | Seiwert et al. | 260—22 |
| 3,437,500 | 4/1969 | Hennig et al. | 106—252 |
| 3,244,673 | 4/1966 | Bruin et al. | 260—22 |
| 3,318,828 | 5/1967 | Seiner | 260—22 |
| 3,349,049 | 10/1967 | Seiwert et al. | 260—22 |
| 3,383,343 | 5/1968 | Mohajer et al. | 260—22 |

FOREIGN PATENTS

| 610,076 | 12/1960 | Canada. |
| 632,220 | 12/1961 | Canada. |
| 720,855 | 11/1965 | Canada. |

DONALD E. CZAJA, Primary Examiner

R. W. GRIFFIN, Assistant Examiner

U.S. Cl. X.R.

117—75, 128.4; 260—21, 22, 33.6